June 19, 1962     O. O. SCHAUS     3,039,848
METHOD OF PREPARING METAL CYANAMIDES
Filed Oct. 23, 1959
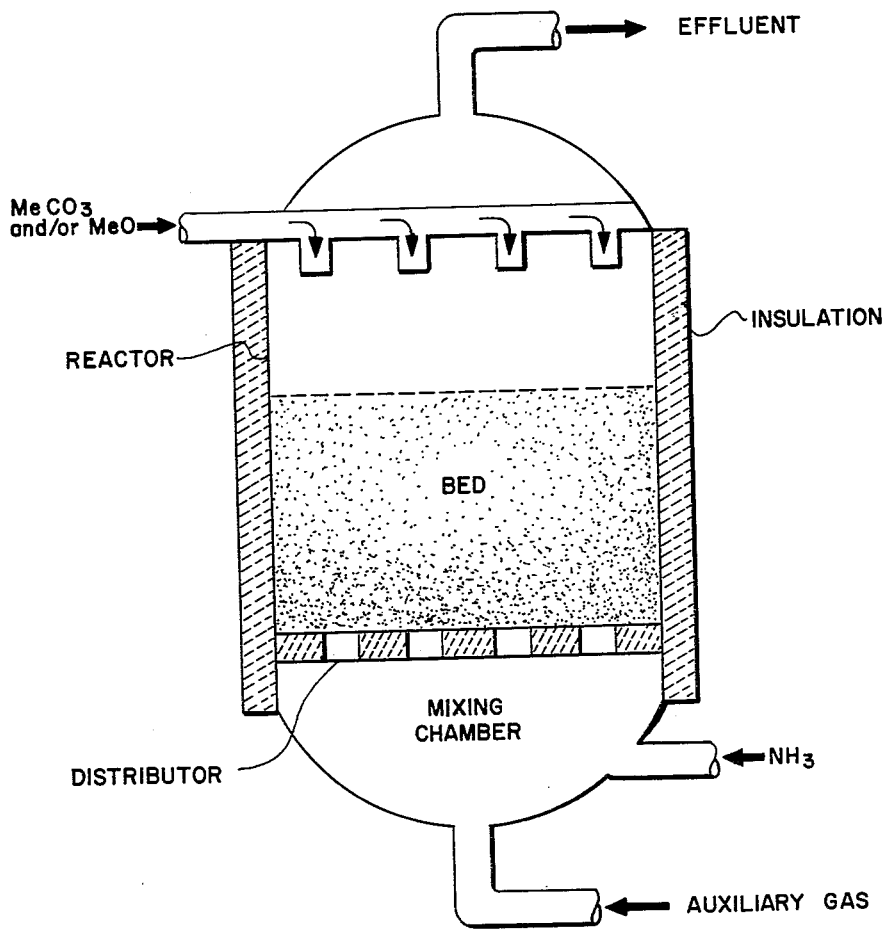
ORLAND O. SCHAUS
*INVENTOR.*
BY
Francis H. Gray
ATTORNEY

United States Patent Office 3,039,848
Patented June 19, 1962

3,039,848
METHOD OF PREPARING METAL CYANAMIDES
Orland O. Schaus, Niagara Falls, Ontario, Canada, assignor to American Cyanamid Company, New York, N.Y., a corporation of Maine
Filed Oct. 23, 1959, Ser. No. 848,343
9 Claims. (Cl. 23—78)

The present invention relates to the preparation of metal cyanamides. More particularly the instant discovery concerns a straightforward method of producing a metal cyanamide, such as calcium cyanamide, by reacting a metal carbonate, such as calcium carbonate and/or a metal oxide, such as calcium oxide, with ammonia under fluidized conditions.

The history of reactions of the general type contemplated herein is voluminous. This is so because it manifests an ardent effort over the years to provide an economically-attractive and efficient method of producing calcium cyanamide, or the like, of high purity and in relatively high yields. Among the many processes which have been attempted are the following:

(I) $CaCO_3 + 2NH_3 \rightarrow CaCN_2 + 3H_2O$
(II) $CaCO_3 + 2NH_3 + 3CO \rightarrow CaCN_2 + 3H_2 + CO_2$
(III) $CaO + 2HCN \rightarrow CaCN_2 + H_2 + CO$ Each of these processes has its own peculiar drawbacks. For Example, Reaction I is endothermic and requires the addition of heat at a heretofore unattractive expense and inconvenience. Reaction II, on the other hand, involves the loss of carbon, the handling of large volumes of hydrogen, and other similar costly characteristics. Reaction III necessitates the use of HCN, an expensive reactant.

Many of the reactions carried out heretofore employed shaft ovens or moveable ovens in the form of stage ovens. Also, a combination of a lime kiln and a nitrogenation oven has been tried.

When using lime particulates as the metal oxide reactant in these furnaces, considerable agglomeration occurred during nitrogenation, i.e., the CaO particulates formed a solid mass. Homogeneous product particulates were practically impossible to obtain and failure was attributed, for the most part, to uneven enrichment of nitrogen.

In order to avoid this drawback, the art experimented, for example, with processes in which alkaline earth oxide solids were blown into a reaction space by means of a carrier gas, such as carbon dioxide or carbon monoxide, the resulting stream of reactant solids being brought into contact with a separate stream of ammonia. To keep the solids in suspension, however, the velocity of the carrier gas inside the reaction zone had to be extraordinarily high. Unfortunately, velocities of such magnitude diminished residence time substantially and seriously impaired the efficiency of the process.

In a last-ditch effort to salvage the system just described, the alkaline earth oxide solids were preheated to high temperatures prior to being blown into the reaction zone. Needless to say, bringing these particulates to proper temperature was a crippling energy requirement both from a standpoint of economics and ease of operation.

There is a long chain of these processes which provide advantages on the one hand and serious problems on the other. By virtue of such frustrations, commercial exploitation of this field has been virtually nil. In most of these processes, as evidenced above, considerable delicate manipulations and substantial investments are indicated to effect suitable and constant temperatures in the reaction area without hampering the reaction.

For example, one of the major difficulties in the production of calcium cyanamide from $CaCO_3$ and $NH_3$ is bringing the reactants to reaction temperature without squandering $NH_3$ by decomposition or substantial decomposition. Reaction I above, for instance, as indicated hereinbefore is endothermic and has often been attempted by indirectly heating the reactants through reactor walls. Needless to say, this has proven ineffectual, impractical and uneconomical. Furthermore, it has been experienced that the $H_2O$ produced during the reaction tends to reverse the reaction and thus detrimentally affects rates and yields.

Supplying heat to these reactants by the internal combustion of a hydrocarbon, such as $CH_4$, is also out of the question for the very same reason, i.e, the $H_2O$ formed is sufficient to reverse the reaction to a considerable degree.

Blowing the solid reactants into the reaction space by means of a carrier gas, such as $CO_2$ or $CO$, not only has the shortcomings defined above but reaction rates and yields are seriously affected when substantial amounts of diluent gases are present. While a regulated amount of diluent gas is desirable to retard dissociation of $NH_3$ to $N_2$ and $H_2$, which is most prevalent when $NH_3$ comes into contact with metal at high temperatures, the yields and rates of processes known heretofore have all too often been reduced by these diluents.

Surprisingly enough, however, the instant discovery handily overcomes the drawbacks mentioned above. As will be seen hereinafter, the present invention affords a relatively simple process which, contrary to expectation based upon what is known in the art, provides high reaction rates and very desirable yields. Furthermore, temperatures in excess of those heretofore contemplated are employed herein with relative ease and impunity, so to speak. In addition and also contrary to expectation, the $H_2O$ formed during reaction does not detrimentally affect rates and yields.

According to the instant invention metal cyanamides are prepared by establishing a bed of particulates, such as calcium carbonate, calcium oxide, cadmium carbonate, cadmium oxide, zinc carbonate, zinc oxide, and mixtures thereof, these particulates having an average particle size in the range of 5 to 60 Tyler mesh, preferably 10 to 48, and maintaining the bed under fluidized conditions by passing upwardly therethrough sufficient of a gaseous mixture of ammonia and an auxiliary gas selected from the group consisting of carbon dioxide, nitrogen and mixtures thereof. Pursuant to the instant discovery the auxiliary gas is preheated to a temperature of at least about 1700° F. and admixed with the ammoniacal component just prior to or substantially upon contacting the bed, thus providing substantially all the heat required by the reaction system and maintaining the reaction zone or bed temperature at at least about 1400° F.

The gaseous effluent resulting from the instant reaction is removed from the bed substantially as formed and the metal cyanamide product recovered from the bed. When more than a relatively small amount, say, at least about 2 percent by weight, of the bed is made up of calcium oxide, sufficient carbon dioxide is employed as a source of carbon for the calcium oxide, i.e., for the production of calcium cyanamide. For example, when about 2 percent by weight CaO is present, at least about 5 percent by volume of $CO_2$, based upon the total fluidizing gas volume, is used to provide sufficient carbon.

The fluidizing gas mixture is passed through the bed at a velocity in the range of 1.5 to 5 feet per second, thus providing an agitated or fluidized bed which appears to be simmering or boiling.

Surprisingly enough, in spite of what is taught in the prior art, it has been discovered that a wide range of ammonia to auxiliary gas concentrations may be employed. Desirable results are achieved in the range of 10:60 parts of ammonia by volume and 90:40 parts of auxiliary gas by volume, the total volume of the combined gases amounting to 100 parts by volume. Preferably from 25:35 parts of ammonia by volume to 75:65 parts of auxiliary gas by volume is used.

The solid reactants contemplated herein, such as $CaCO_3$ and $CaO$, may be admixed in any proportion or they may be employed singly, as will be seen hereinafter.

The process of the instant discovery may be carried out continuously, semi-continuously or batchwise. While it is preferred to operate at substantially atmospheric pressure, pressures up to about 2 atmospheres or more are contemplated herein.

The hot auxiliary gas may be provided in several ways. For example, it may be preheated to a temperature in the range of 1700° F. to 2400° F., preferably 1750° F. to 2150° F., before entering the bed. Also, it has been discovered that very desirable results are obtained by burning CO in $O_2$ or air at high temperatures and introducing the resulting gaseous $CO_2$-containing product into the bed.

In this manner a unique source of $CO_2$ and heat is provided in situ with numerous advantages. As indicated above, not only is it surprising that significant reaction rates and product yields can be provided by the present invention, but the in situ and conjoint preparation of auxiliary gas and heat without sacrificing these significant results is equally surprising.

Preferably, the auxiliary gas is substantially free of CO. By substantially free is meant that only a small amount, up to about 5 percent by volume, based upon the total auxiliary gas volume, may be tolerated. The CO, it is believed, accounts for loss of $NH_3$ to HCN, an undesirable side reaction.

The bed temperature or reaction temperature may be in the range of 1400° F. to 1800° F., preferably 1500° F. to 1700° F.

As also indicated above, substantially all the heat required by the reaction system is provided by the preheated gaseous component, such as $CO_2$. This is an important advantage of the instant discovery which, unexpectedly, permits very efficient operation at temperatures considerably higher than those taught in the art and, equally unexpectedly, without the necessity of external heat and reactors of very limited size.

Pursuant to a preferred embodiment of the instant discovery, a fluidized or simmering bed of calcium carbonate particulates having a particle mesh size of about 6 x 10, i.e., all the particles pass through a 6-mesh screen and are all retained by a 10-mesh screen, is established in a vertically-disposed fluidized bed reactor and upwardly therethrough a gaseous mixture of ammonia and carbon dioxide is passed at a rate of about 3.5 feet per second. Based upon 100 percent by volume of the total gaseous mixture, the ammonia represents 30 percent by volume and the carbon dioxide 70 percent by volume. The gaseous mixture is provided by separate streams or flows of carbon dioxide gas, preheated to a temperature of about 1950° F., and ammonia, these streams being merged just prior to their entry into the bed. A bed temperature of about 1650° F. results.

The bed temperature, flow rate and fluidizing gas concentration are maintained substantially constant for a period of about 45 minutes, at which point the process is terminated and the percent by weight calcium cyanamide product in the bed determined.

The FIGURE in the attached drawing is a cross-sectional view, partly schematic, of a reactor useful for the present invention. As shown in the drawing, the reactor is cylindrical, vertically-disposed and is rounded at the top and bottom. If desired, it may be insulated as shown. Through the bottom of the reactor are two openings, one for ammonia and the other for auxiliary gases. Likewise, through the top are two openings, as shown, to accommodate the metal carbonate and/or metal oxide reactant fed to the reactor as taught herein and to permit removal of effluent, respectively.

At a predetermined distance above the bottom of the reactor and inside same is a distributor plate which, in addition to its function as a manifold, supports the metal carbonate and/or metal oxide bed particulates and provides the upper wall of a mixing chamber for the $NH_3$ and other gases which may be used for fluidizing.

Obviously, many modifications of the exemplary reactor aforedescribed would occur to one skilled in the art. For instance, rather than the single ammonia intake conduit, or the single auxiliary gas conduit, multiple conduits may be employed. Conversely, with respect to the metal carbonate or metal oxide feed manifold shown in the drawing, a single feed inlet may be employed.

Preferably, the reactor employed herein is non-metallic, such as quartz, silica, silicon carbide, or the like, and can withstand high temperatures. If desired, a metal reactor which has been coated with a non-metallic, high temperature-resistant material may be used. As indicated hereinabove, preventing $NH_3$ from coming into direct contact with metal at high temperatures substantially minimizes decomposition. Refractory material substantially free of iron, for example, is very well suited for the purposes contemplated herein.

The following table demonstrates typical runs carried out according to the present invention using the fluidized bed shown in the drawing and under the conditions appearing in the table.

*Table I*

$CaCO_3$

| Run No. | Paricle Size (Mesh) | Gas Velocity in feet per second | Bed Temperature, ° F. | $CO_2$ Preheat Temperature, ° F. | Fluidizing gas | |
|---|---|---|---|---|---|---|
| | | | | | Percent $NH_3$ by volume | Percent $CO_2$ by volume |
| 1 | [1] 10x16 | 5.0 | 1,550 | 1,850 | 30.0 | 70.0 |
| 2 | 10x48 | 2.0 | 1,500 | 2,100 | 60.0 | 40.0 |
| 3 | 10x28 | 4.0 | 1,600 | 2,000 | 40.0 | 60.0 |
| 4 | 20x48 | 2.0 | 1,550 | 1,750 | 25.0 | 75.0 |
| 5 | 6x10 | 4.0 | 1,650 | 1,950 | 30.0 | 70.0 |
| CaO | | | | | | |
| 6 | 6x48 | 3.0 | 1,550 | 1,800 | 25.0 | 75.0 |
| 7 | 20x48 | 4.0 | 1,600 | 1,850 | 25.0 | 75.0 |
| 8 | 10x28 | 4.0 | 1,600 | 1,950 | 40.0 | 60.0 |
| 9 | 28x48 | 2.0 | 1,650 | 2,050 | 40.0 | 60.0 |

[1] I.e., all particles pass through a 10 mesh screen and are retained by a 16 mesh screen.

In each of the above runs very desirable high yields of calcium cyanamide of high purity are produced after three-quarters of an hour. Of course, rather than terminate the reaction at the end of an hour or less, the product could by appropriate means be continuously or intermittently removed while simultaneously replenishing the bed with fresh reactant solids. For example, a product purge conduit may be provided from the lower half of the bed appearing in the attached drawing.

The following table teaches further representative runs made under conditions similar to those in Table I, above, the differences being given in the table:

Table II
CaCO₃

| Run No. | Particle size (mesh) | Gas velocity in feet per second | Bed Temperature, °F. | Fluidizing gas | | | CO₂ Preheat Temperature, °F. | N₂ Preheat Temperature, °F. |
| --- | --- | --- | --- | --- | --- | --- | --- | --- |
| | | | | Percent NH₃ by volume | Percent CO₂ by volume | Percent N₂ by volume | | |
| 10 | ¹ 10 x 28 | 3.0 | 1,650 | 33.33 | 33.33 | 33.33 | 1,950 | 1,950 |
| 11 | 10 x 28 | 3.0 | 1,650 | 33.33 | 66.66 | ---------- | 1,950 | ---------- |
| 12 | 10 x 28 | 3.0 | 1,650 | 33.33 | ---------- | 66.66 | ---------- | 1,925 |
| CaO (95%) + CaCO₃ (1%)² | | | | | | | | |
| 13 | 10 x 28 | 3.0 | 1,650 | 25.0 | 75.0 | ---------- | 1,950 | ---------- |
| 14 | 10 x 28 | 3.0 | 1,650 | 25.0 | 75.0 | ---------- | 1,950 | ---------- |
| CaO (92%) + CaCO₃ (7%)² | | | | | | | | |
| 15 | 10 x 28 | 3.21 | 1,603 | 20.66 | 47.0 | 28.66 | 1,900 | 1,900 |

¹ I.e., all particles pass through a 10 mesh screen and retained by a 28 mesh screen.
² Percent in table means percent by weight.

Likewise, very significant yields of calcium cyanamide are produced in runs 10 through 15 after one hour, and even after about 45 minutes.

While the present invention has been described with particularity using calcium carbonate and calcium oxide as reactants, this is by no means intended to restrict the scope of the invention. As indicated above, substitution of other metal carbonates and/or metal oxides, such as the carbonates and oxides of cadmium and zinc, and mixtures thereof, for limestone or lime, under the conditions given in the table above, for example, is within the purview of the instant discovery.

In addition, although the illustrations given herein contain certain limitations, the invention is not intended to be limited thereby, except insofar as these limitations appear in the appended claims:

I claim:

1. A method of preparing calcium cyanamide which comprises establishing a bed consisting essentially of particulates selected from the group consisting of calcium carbonate, calcium oxide, and mixtures thereof, and having an average particle size in the range of 5 to 60 Tyler mesh, maintaining said bed under fluidized conditions by passing upwardly therethrough sufficient of a gaseous mixture consisting essentially of ammonia and an auxiliary gas selected from the group consisting of carbon dioxide, nitrogen and mixtures thereof, the auxiliary gas being at a temperature of at least about 1700° F. just prior to contacting the bed particulates, maintaining a bed temperature of at least about 1400° F., said auxiliary gas providing substantially all the heat of reaction, and when more than a relatively small amount of the bed is made up of calcium oxide, sufficient carbon dioxide is employed as a source of carbon for the formation of calcium cyanamide, removing the resulting gaseous effluent from said bed substantially as formed and recovering product calcium cyanamide from said bed.

2. The process of claim 1 wherein the ammonia and auxiliary gas are admixed just prior to contacting the bed.

3. The process of claim 1 wherein the ammonia and auxiliary gas fluidizing mixture is passed through the bed at a velocity in the range of 1.5 to 5 feet per second.

4. The process of claim 1 wherein the bed comprises calcium carbonate particulates.

5. The process of claim 1 wherein the bed comprises calcium oxide particulates.

6. The process of claim 1 wherein the bed comprises a mixture of calcium carbonate and calcium oxide.

7. The process of claim 1 wherein the auxiliary gas is carbon dioxide.

8. The process of claim 1 wherein the ammonia to auxiliary gas concentration fed to the bed is in the range of 10:60 parts of ammonia by volume to 90:40 parts of auxiliary gas by volume.

9. The process of claim 1 wherein the ammonia to auxiliary gas concentration fed to the bed is in the range of 25:35 parts of ammonia by volume to 75:65 parts of auxiliary gas by volume.

References Cited in the file of this patent

UNITED STATES PATENTS 2,884,307    Kaess et al.    Apr. 28, 1959
2,917,363    Hachmuth et al.    Dec. 15, 1959

FOREIGN PATENTS 737,520    Great Britain    Sept. 28, 1955